United States Patent
Ma et al.

(10) Patent No.: US 10,897,188 B2
(45) Date of Patent: Jan. 19, 2021

(54) VOICE COIL MOTOR, CAMERA MODULE, AND ELECTRONIC DEVICE USING THE SAME

(71) Applicant: TRIPLE WIN TECHNOLOGY(SHENZHEN) CO. LTD., Shenzhen (CN)

(72) Inventors: Xiao-Mei Ma, Guangdong (CN); Shin-Wen Chen, New Taipei (TW); Long-Fei Zhang, Guangdong (CN); Kun Li, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/561,386

(22) Filed: Sep. 5, 2019

(65) Prior Publication Data
US 2020/0266693 A1 Aug. 20, 2020

(30) Foreign Application Priority Data

Feb. 19, 2019 (CN) .......................... 2019 1 0123887

(51) Int. Cl.
*H02K 41/035* (2006.01)
*H04N 5/225* (2006.01)
*G02B 7/08* (2006.01)

(52) U.S. Cl.
CPC .......... *H02K 41/0356* (2013.01); *G02B 7/08* (2013.01); *H04N 5/2252* (2013.01); *H04N 5/2253* (2013.01); *H04N 5/2254* (2013.01); *H04N 5/2257* (2013.01)

(58) Field of Classification Search
CPC ............. H02K 41/0356; H04N 5/2254; H04N 5/2253; H04N 5/2252; H04N 5/2257; G02B 7/08
See application file for complete search history.

(56) References Cited

U.S. PATENT DOCUMENTS

| | | | |
|---|---|---|---|
| 2010/0128370 A1* | 5/2010 | Chen | G02B 7/08 359/824 |
| 2011/0141338 A1* | 6/2011 | Lee | H04N 5/2251 348/342 |
| 2011/0164326 A1* | 7/2011 | Hsu | G02B 13/005 359/691 |
| 2015/0153540 A1 | 6/2015 | Lee | |
| 2015/0212291 A1* | 7/2015 | Lee | G02B 7/08 348/360 |
| 2018/0252893 A1* | 9/2018 | Park | H02K 41/035 |
| 2019/0243087 A1* | 8/2019 | Osaka | H04M 1/0264 |

FOREIGN PATENT DOCUMENTS

CN 104698567 A 6/2015

* cited by examiner

Primary Examiner — Nhan T Tran
(74) Attorney, Agent, or Firm — ScienBiziP, P.C.

(57) ABSTRACT

A voice coil motor in a camera module with a means of being mounted robustly on a base comprises a casing and the base. The casing is hollow, the casing comprises a top surface and a side wall around the top surface. The base comprises a base portion and projections, the base portion being in contact with the side wall of the casing and engaged with the casing to form a cavity. The side wall is provided with recesses external to the cavity to accept the projections, the projections lending structural reinforcement to the casing.

9 Claims, 13 Drawing Sheets

VOICE COIL MOTOR, CAMERA MODULE, AND ELECTRONIC DEVICE USING THE SAME

FIELD

The subject matter relates to cameras, and in particular, to a voice coil motor and electronic device using the voice coil motor.

BACKGROUND

Electronic devices, such as mobile phones or tablet computers, can have camera modules. As the electronic device becomes thinner and lighter, the camera module also becomes thinner and lighter. The camera module can be thinner and lighter by reducing the size of the casing of the camera module, for example. However, when the casing becomes smaller, the contact area between the casing and the base of the camera module also becomes smaller. Since the casing and the base are bonded together by an adhesive, adhesion force between the casing and the base becomes smaller. Therefore, the casing and the base may be easily separated from each other.

Therefore, there is room for improvement in the art.

BRIEF DESCRIPTION OF THE DRAWINGS

Implementations of the present disclosure will now be described, by way of embodiments only, with reference to the drawings.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

First Embodiment

Figure 1:
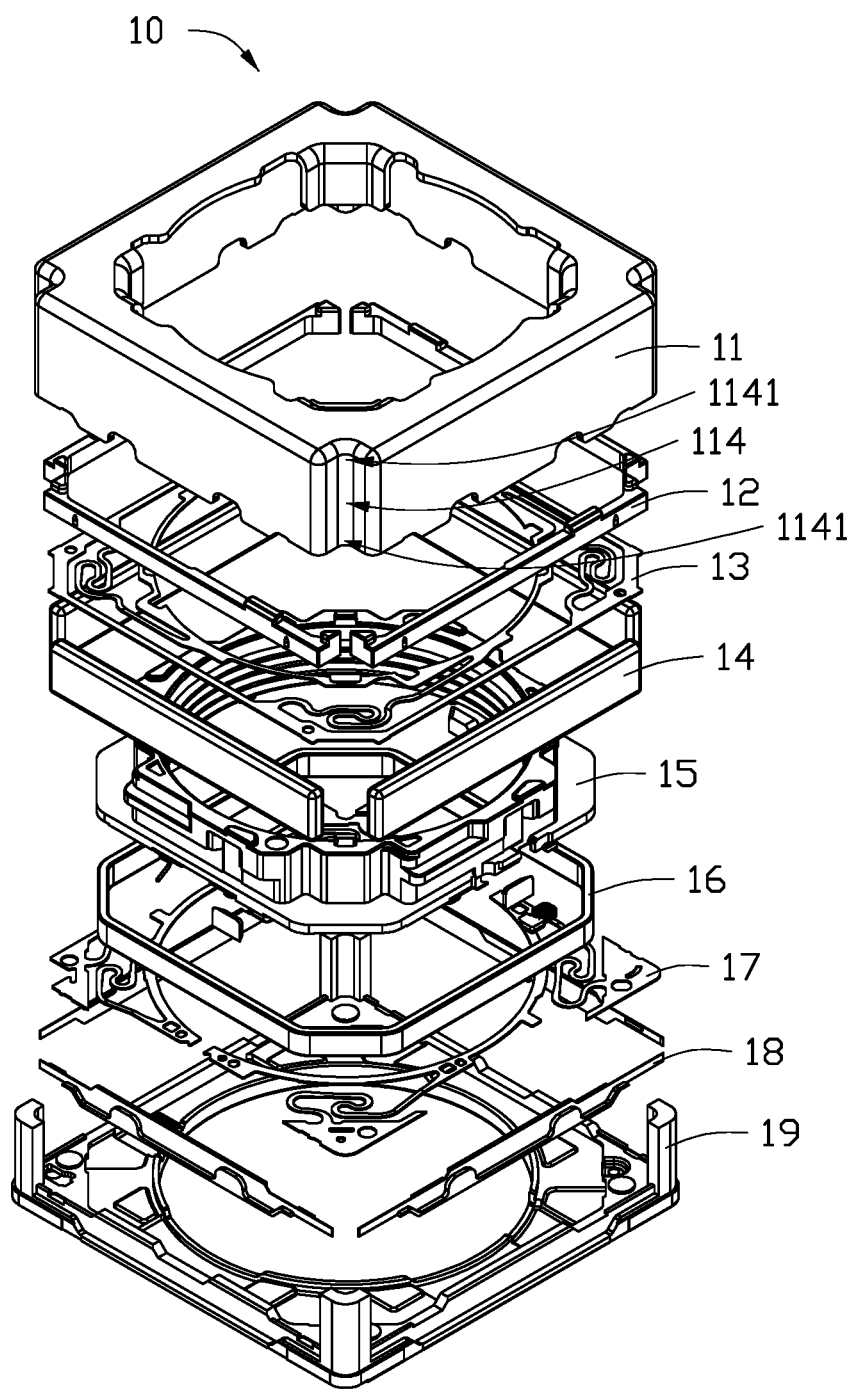
FIG. 1 is an exploded view of a voice coil motor according to a first embodiment of the present disclosure.

Referring to FIG. 1, the voice coil motor 10 includes a casing 11, an upper cover 12, an upper elastic plate 13, a magnet 14, a lens base 15, a coil 16, a lower elastic plate 17, an auxiliary frame 18, and a base 19. The casing 11 and the base 19 are fastened to each other to form a cavity. The upper cover 12, the upper elastic plate 13, the magnet 14, the lens holder 15, the coil 16, the lower elastic plate 17, and the auxiliary frame 18 are sequentially disposed in the cavity.

The lens base 15 can support a lens of the voice coil motor 10. The coil 16 is disposed at a side of the lens holder 15 near the base 19. The magnet 14 is disposed between the lens base 15 and the casing 11. The upper elastic plate 13 and the lower elastic plate 17 are respectively disposed at opposite sides of the lens holder 15. The upper cover 12 is disposed between the upper elastic plate 13 and the casing 11.

Figure 2:
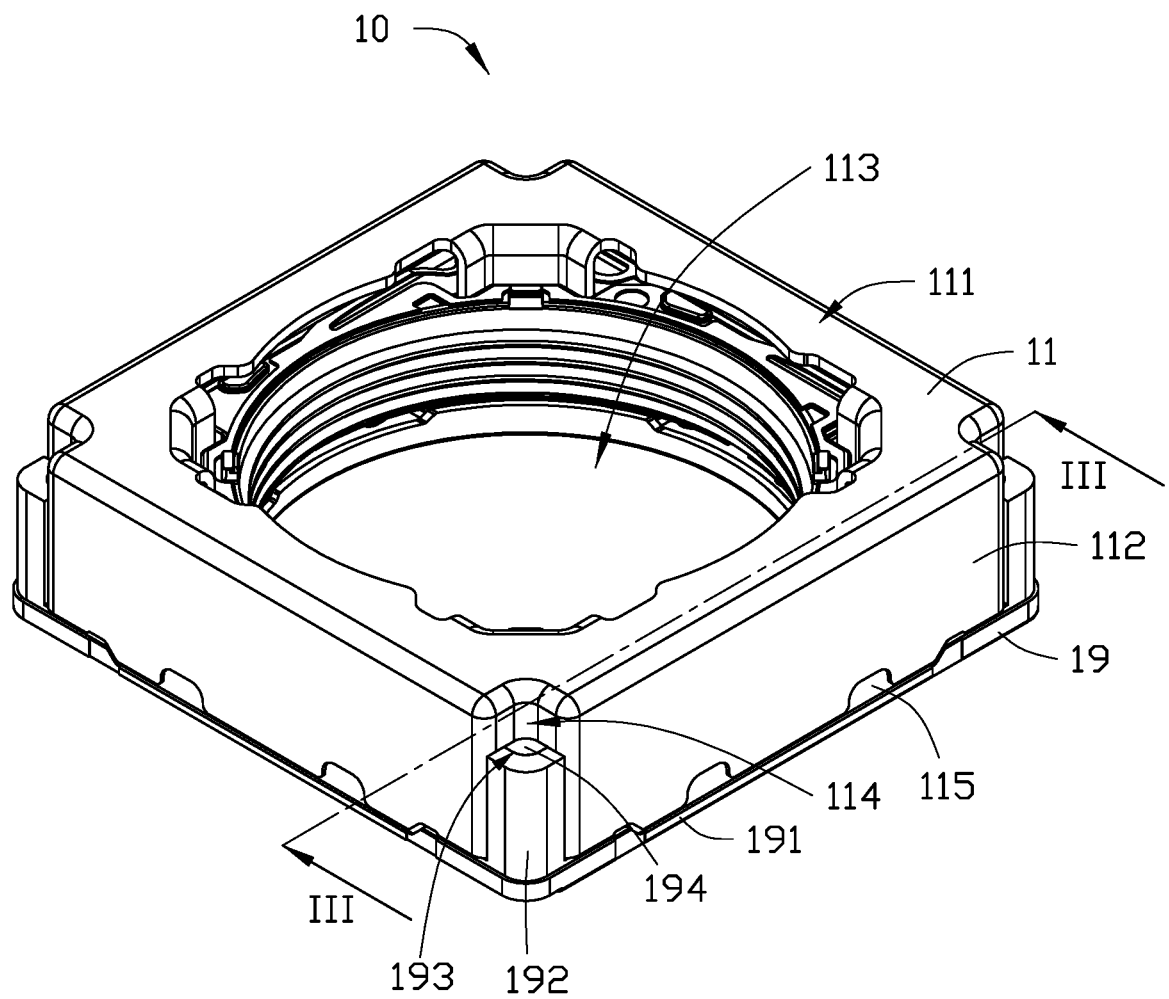
FIG. 2 is a perspective view of the voice coil motor of FIG. 1.

Referring to FIG. 2, the casing 11 has a hollow structure. The casing 11 includes a top surface 111 and at least one side wall 112 extending from an edge of the top surface 111. An opening 113 is defined at the top surface 111, penetrating the top surface 111. The lens can emit light towards or receive light from the opening 113. The side wall 112 defines at least one recess 114. The recess 114 can be disposed at the corner of the casing 11, and passes through the top surface 111 and another surface of the casing 11 opposite to the casing 11 (that is, the surface facing the base 19). The recess 114 includes two end portions 1141. One end portion 1141 of the recess 114 is aligned with the surface of the casing 11 facing the base 19 (see FIG. 3). The recess 114 does not pass through the side wall 112. That is, an inner portion of the side wall 112 forms a side of the recess 114, which is connected between the two end portions 1141 of the recess 114 (see FIG. 3). The edge of the side wall 112 away from the top surface 111 further defines a notch 115. In one embodiment, the casing 11 is rectangular, the number of side walls 112 is four. Each recess 114 is defined at the boundary of each of the side walls 112. The number of notches 115 is greater than four. At least two of the notches 115 are positioned at the edge of each side wall 112. In other embodiments, the casing 11 bounded by the side wall 112 may be cylindrical. Adhesive can be injected into the voice coil motor 10 through the notches 115.

The base 19 includes a base portion 191 and at least one projection 192. In one embodiment, the number of projections 192 is four. The base portion 191 is in contact with the edges of the side wall 112 facing away from the top surface 111. The projection 192 protrudes from the base portion 191 along an extending direction of the side wall 112, and is received in the recess 114. The height of the projection 12 is less than the depth of the recess 114 (that is, a thickness of the casing 11).

Figure 3:
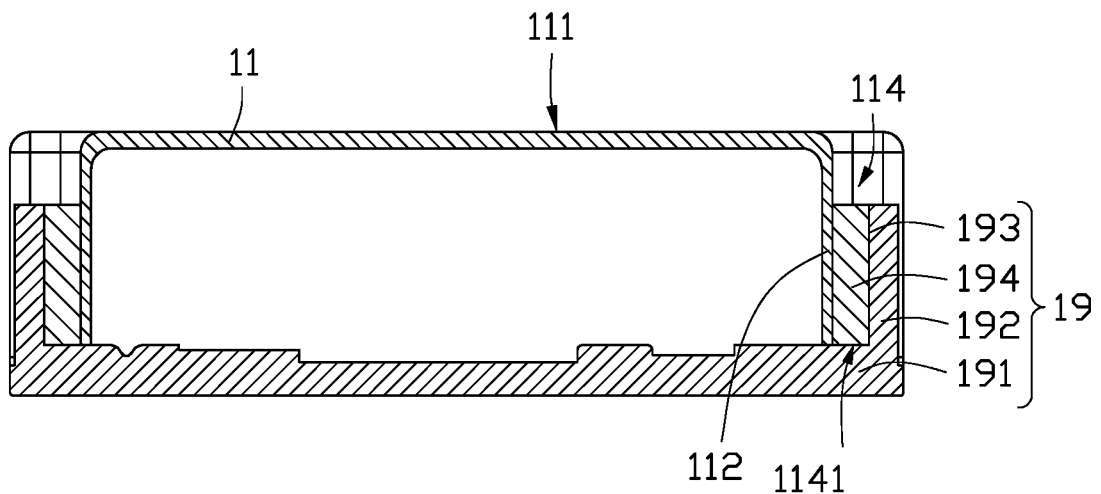
FIG. 3 is a cross-sectional view along line III-III of FIG. 2.

Referring to FIG. 3, the base 19 further includes a receiving portion 193 and an adhesive layer 194 received in the receiving portion 193. The receiving portion 193 is disposed at a side of the projection 192 facing the recess 114. The receiving portion 193 may be columnar or conical. After the casing 11 is engaged with the base 19, adhesive can be injected into the receiving portion 193 to form the adhesive layer 194, which bonds the casing 11 and the base 19 together.

Second Embodiment

Figure 4:
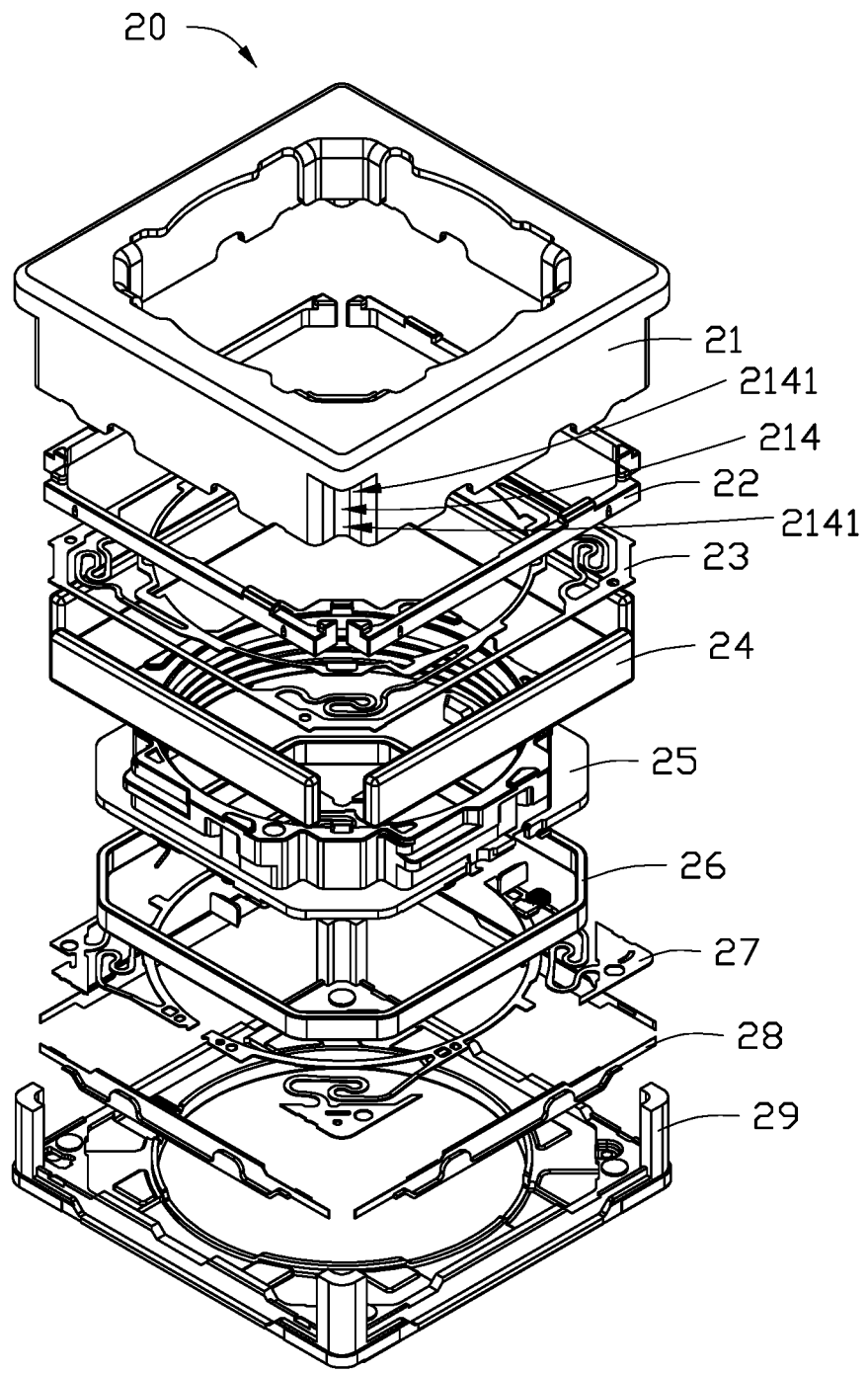
FIG. 4 is an exploded view of a voice coil motor according to a second embodiment of the present disclosure.

Referring to FIG. 4, the voice coil motor 20 includes a casing 21, an upper cover 22, an upper elastic plate 23, a magnet 24, a lens base 25, a coil 26, a lower elastic plate 27, an auxiliary frame 28, and a base 29. The casing 21 and the base 29 are fastened to each other to form a cavity. The upper cover 22, the upper elastic plate 23, the magnet 24, the lens holder 25, the coil 26, the lower elastic plate 27, and the auxiliary frame 28 are sequentially disposed in the cavity.

The lens base 25 can support a lens of the voice coil motor 20. The coil 26 is disposed at a side of the lens holder 25 near the base 29. The magnet 24 is disposed between the lens base 25 and the casing 21. The upper elastic plate 23 and the lower elastic plate 27 are respectively disposed at opposite sides of the lens holder 25. The upper cover 22 is disposed between the upper elastic plate 23 and the casing 21.

Figure 5:
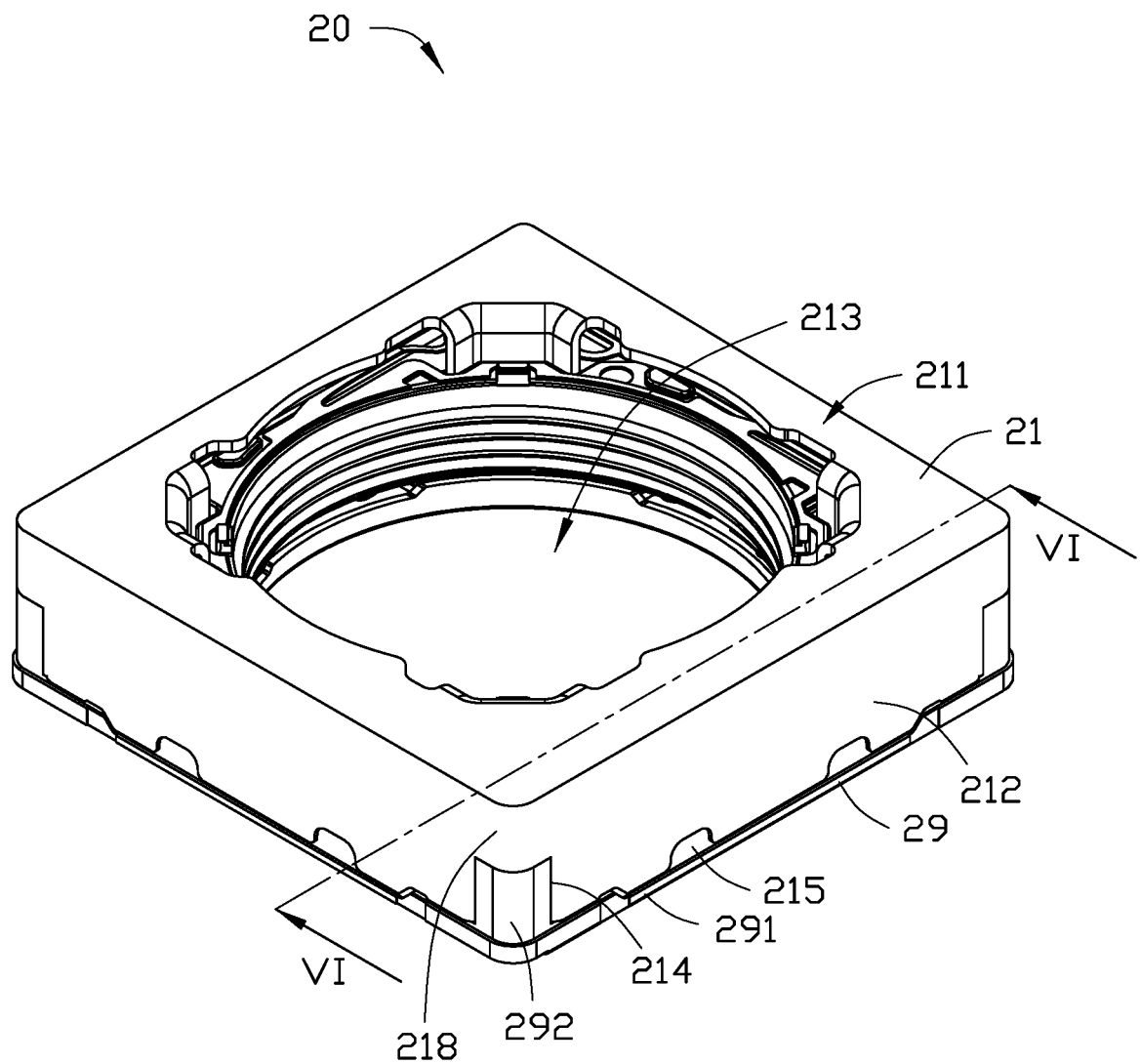
FIG. 5 is a perspective view of the voice coil motor of FIG. 4.

Referring to FIG. 5 the casing 21 has a hollow structure. The casing 21 includes a top surface 211 and at least one side wall 212 extending from an edge of the top surface 211. An opening 213 is defined at the top surface 211, which penetrates the top surface 211. The lens can emit light towards or receive light from the opening 113. The side wall 212 defines at least one recess 214. The recess 214 can be disposed at the corner of the casing 21, and does not pass through the top surface 211. The recess 214 includes two end portions 2141 (see FIG. 6). One end portion 2141 of the recess 214 is aligned with the surface of the casing 21 facing the base 29. The recess 214 does not pass through the side wall 212. That is, an inner portion of the side wall 212 forms a side of the recess 214, which is connected between the two end portion 2141 of the recess 214 (see FIG. 6). The edge of the side wall 212 away from the top surface 211 further definers a notch 215. In one embodiment, the casing 21 is rectangular, the number of side walls 212 is four. Each recess 214 is defined at the boundary of each of the side walls 212. The number of notches 215 is greater than four. At least two of the notches 215 are positioned at the edge of each side wall 212. In other embodiments, the casing 21 may be cylindrical and have only one side wall 212 surrounding the top surface 211. Adhesive can be injected into the voice coil motor 20 through the notches 215.

The base 29 includes a base portion 291 and at least one projection 292. In one embodiment, the number of projections 292 is four. The base portion 291 is in contact with the edges of the side wall 212 facing away from the top surface 211. The projection 292 protrudes from the base portion 291 along an extending direction of the side wall 212, and is received in the recess 214. The height of the projection 22 is less than the depth of the recess 214 (that is, a thickness of the casing 21).

Figure 6:
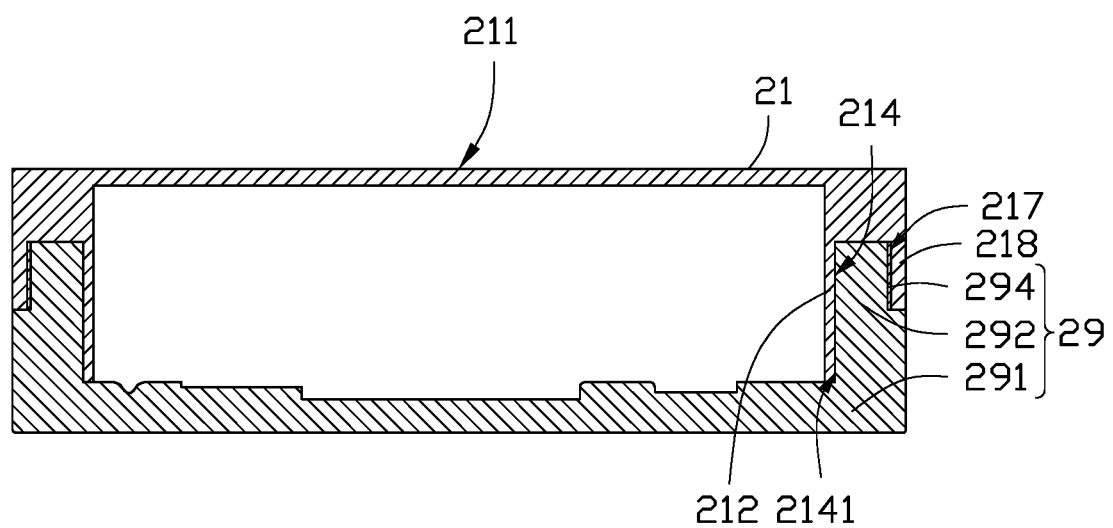
FIG. 6 is a cross-sectional view along line VI-VI of FIG. 5.

Referring to FIG. 6, the recess 214 does not penetrate the top surface 211. That is, the top surface 211 forms one end portion 2141 of the recess 214. The other end portion 2141 is aligned with the surface of the casing 11 facing the base 19. The recess 214 does not pass through the side wall 212. That is, an inner portion of the side wall 212 forms a side of the recess 214, which is connected between the two end portions 2141 of the recess 214. The outer portion of the side wall 212 forms a shielding portion 218. The shielding portion 218 is connected to the top surface 211, and forms another side of the recess 214. One end of the projection 292 away from the base 29 is covered by the shielding portion 218. There is a gap 217 between the portion of the projection 292 covered by the shielding portion 218 and the shielding portion 218. The gap 217 can be filled with the adhesive layer 294 to bond the shielding portion 218 and the side wall 212.

Third Embodiment

Figure 7:
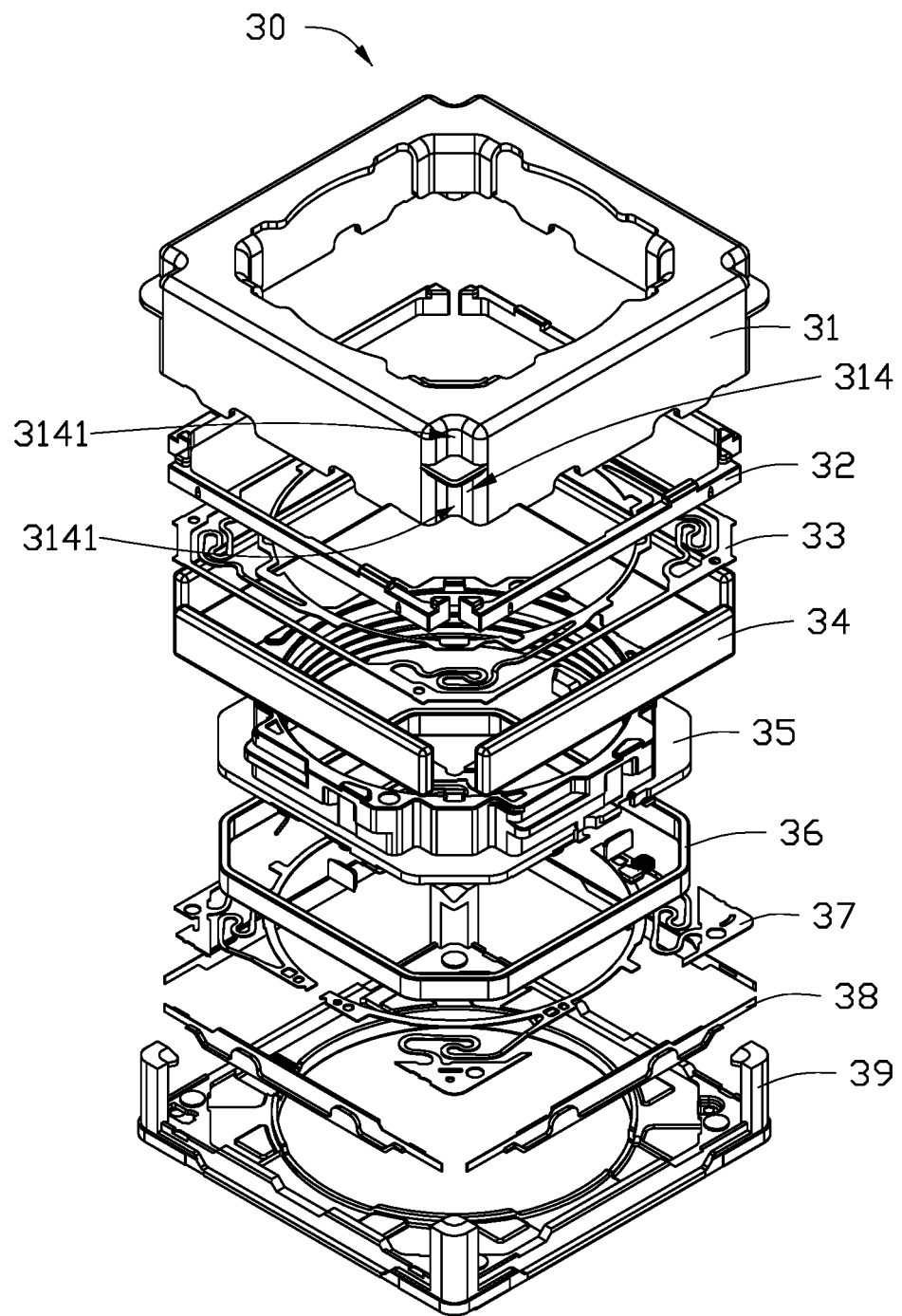
FIG. 7 is an exploded view of a voice coil motor according to a third embodiment of the present disclosure.

Referring to FIG. 7, the voice coil motor 30 includes a casing 31, an upper cover 32, an upper elastic plate 33, a magnet 34, a lens base 35, a coil 36, a lower elastic plate 37, an auxiliary frame 38, and a base 39. The casing 31 and the base 39 are fastened to each other to form a cavity. The upper cover 32, the upper elastic plate 33, the magnet 34, the lens holder 35, the coil 36, the lower elastic plate 37, and the auxiliary frame 38 are sequentially disposed in the cavity.

The lens base 35 can support a lens of the voice coil motor 30. The coil 36 is disposed at a side of the lens holder 35 near the base 39. The magnet 34 is disposed between the lens base 35 and the casing 31. The upper elastic plate 33 and the lower elastic plate 37 are respectively disposed at opposite sides of the lens holder 35. The upper cover 32 is disposed between the upper elastic plate 33 and the casing 31.

Figure 8:
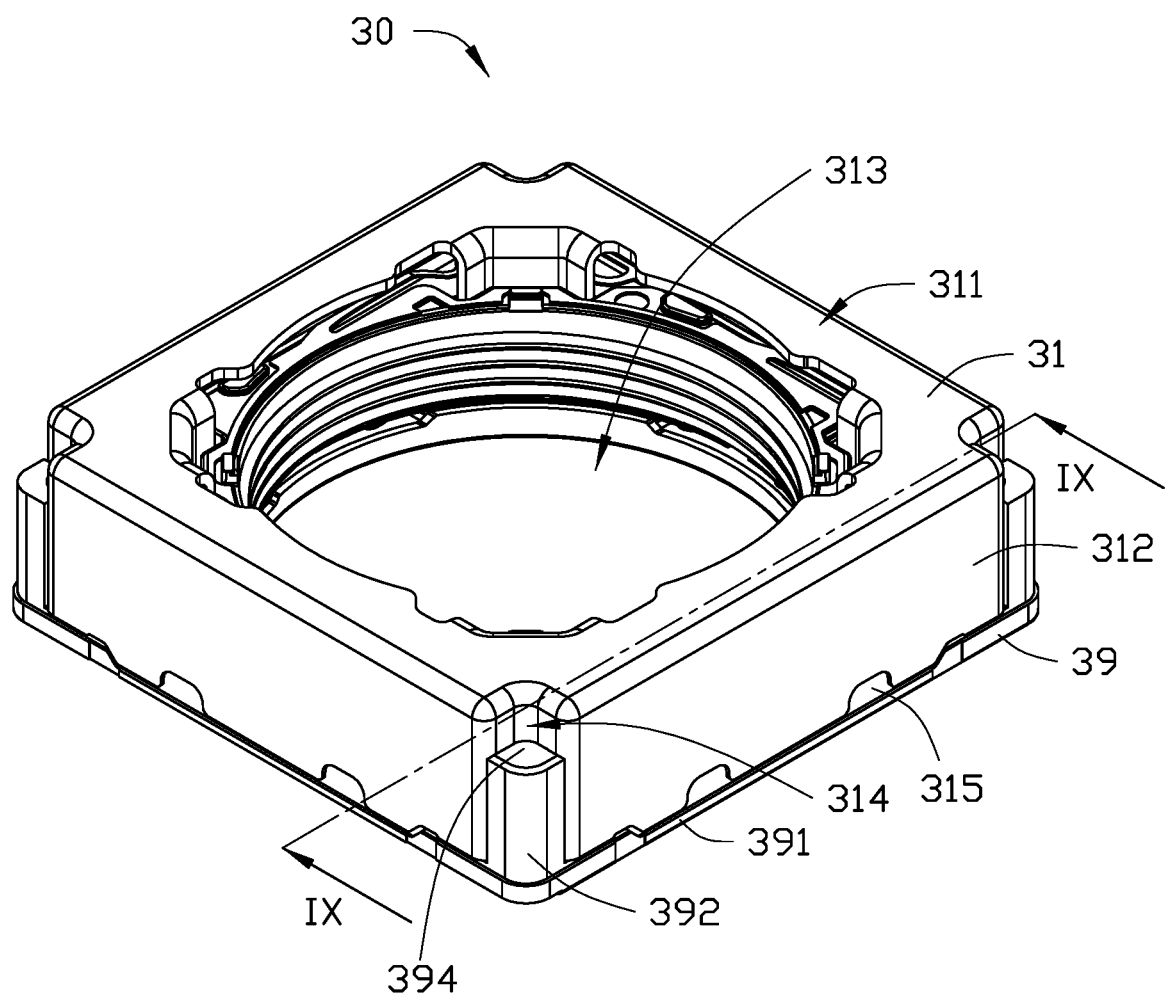
FIG. 8 is a perspective view of the voice coil motor of FIG. 7.

Referring to FIG. 8, the casing 31 has a hollow structure. The casing 31 includes a top surface 311 and at least one side wall 312 extending from an edge of the top surface 311. An opening 313 is defined at the top surface 311, penetrating the top surface 311. The lens can emit light towards or receive light from the opening 313. The edge of the side wall 312 defines at least one recess 314. The recess 314 includes two end portions 3141 (see FIG. 9). One end portion 3141 of the recess 314 is aligned with the surface of the casing 31 facing the base 39. The recess 314 does not pass through the side wall 312. That is, an inner portion of the side wall 312 forms a side of the recess 314, which is connected between the two end portions 3141 of the recess 314 (see FIG. 9). The edge of the side wall 312 away from the top surface 311 further definers a notch 315. In one embodiment, the casing 31 is rectangular, the number of side walls 312 is four. Each recess 314 is defined at the boundary of each of the side walls 312. The number of notches 315 is greater than four. At least two of the notches 315 are positioned at the edges of each side wall 312. In other embodiments, the casing 31 may be cylindrical greater than four side walls 312. Adhesive can be injected into the voice coil motor 30. through the notches 315

The base 39 includes a base portion 391 and at least one projection 392. In one embodiment, the number of projections 392 is four. The base portion 391 is in contact with the edges of the side wall 312 facing away from the top surface 311. The projection 392 protrudes from the base portion 391 along an extending direction of the side wall 312, and is received in the recess 314. The height of the projection 32 is less than the depth of the recess 314 (that is, a thickness of the casing 31).

Figure 9:
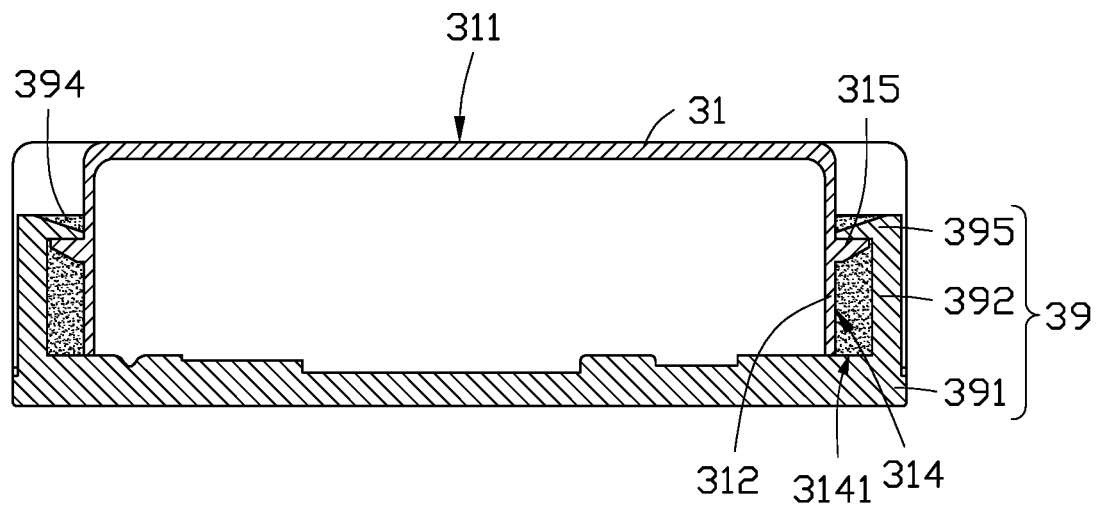
FIG. 9 is a cross-sectional view along line IX-IX of FIG. 8.

Referring to FIG. 9, the base 39 further includes a first buckle 395. In one embodiment, the buckle 395 is disposed at an end of the projection 392 away from the base portion 391, and extends to the casing 31. In other embodiments, the first buckle 395 can also be disposed anywhere between the two ends of the projection 392. The casing 31 further includes a second buckle 316 extending to the projection 392. In one embodiment, the second buckle 316 is disposed at an end of the recess 314 away from the base portion 391. In other embodiments, the second buckle 316 can also be disposed anywhere between the two ends of the recess 314.

The first buckle 395 is engaged with the second buckle 316. In one embodiment, the number of the first and second buckles 395 and 316 is equal, and only one second buckle 316 is disposed in one recess 314. An adhesive layer 394 can be injected into the recess 314 for bonding the casing 31 and the base 39.

Fourth Embodiment

Figure 10:
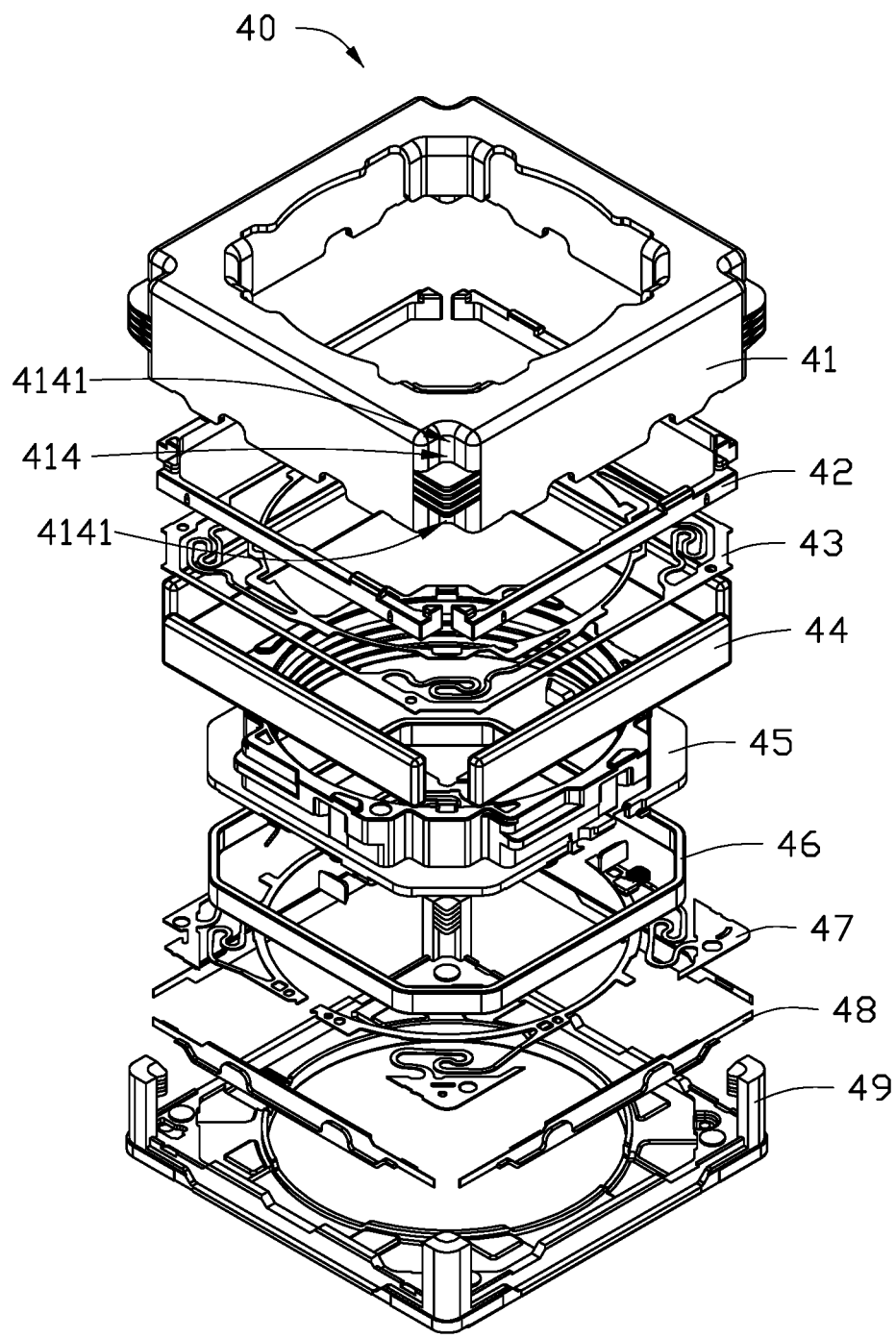
FIG. 10 is an exploded view of a voice coil motor according to a fourth embodiment of the present disclosure.

Referring to FIG. 10, the voice coil motor 40 includes a casing 41, an upper cover 42, an upper elastic plate 43, a magnet 44, a lens base 45, a coil 46, a lower elastic plate 47, an auxiliary frame 48, and a base 49. The casing 41 and the base 49 are fastened to each other to form a cavity. The upper cover 42, the upper elastic plate 43, the magnet 44, the lens holder 45, the coil 46, the lower elastic plate 47, and the auxiliary frame 48 are sequentially disposed in the cavity.

The lens base 45 support a lens of the voice coil motor 40. The coil 46 is disposed at a side of the lens holder 45 near the base 49. The magnet 44 is disposed between the lens base 45 and the casing 41. The upper elastic plate 43 and the lower elastic plate 47 are respectively disposed at opposite sides of the lens holder 45. The upper cover 42 is disposed between the upper elastic plate 43 and the casing 41.

Figure 11:
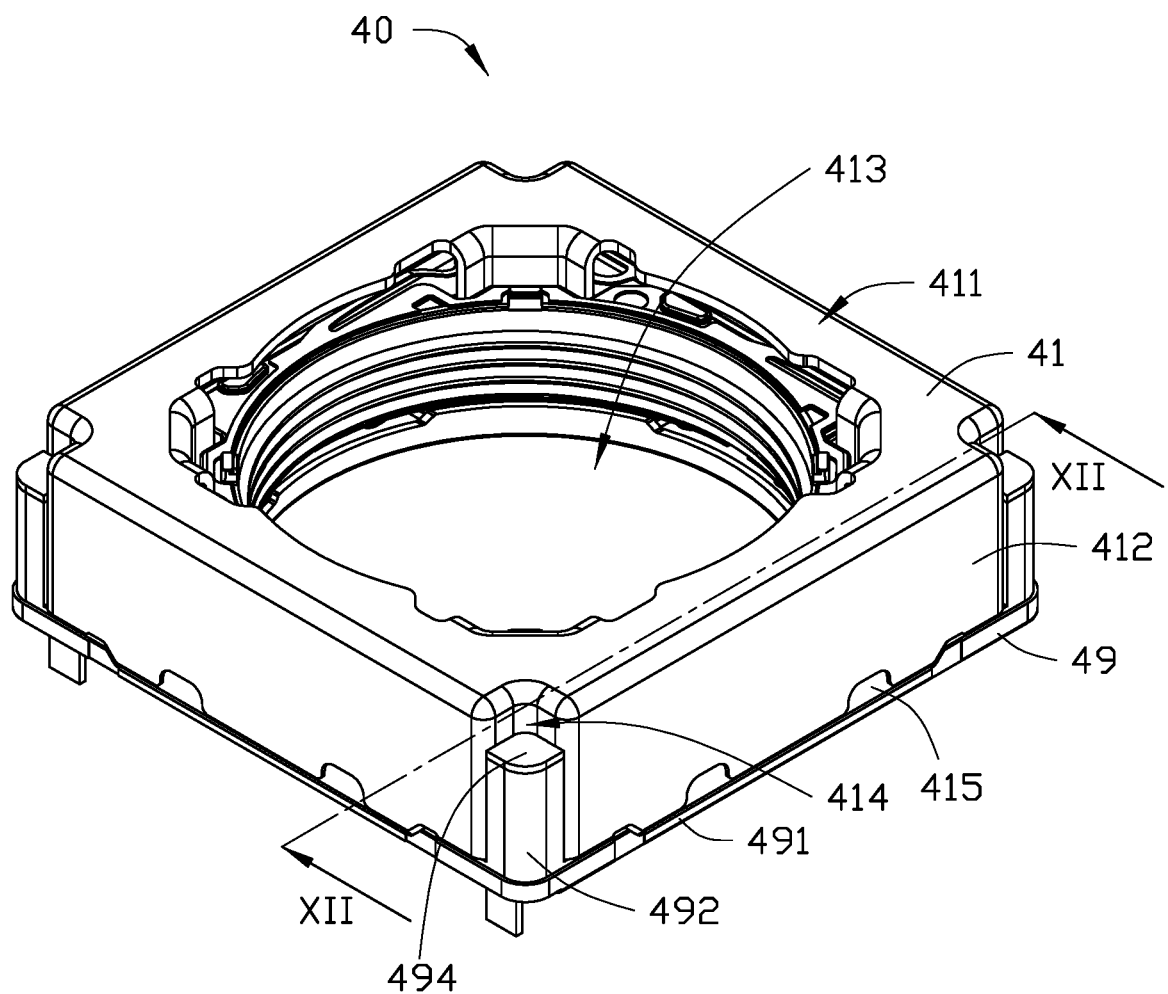
FIG. 11 is a perspective view of the voice coil motor of FIG. 10.

Referring to FIG. 11, the casing 41 has a hollow structure. The casing 4 includes a top surface 411 and at least one side wall 412 extending from an edge of the top surface 411. An opening 413 is defined at the top surface 411, penetrating the top surface 411. The lens can emit light towards or receive light from the opening 413. The side wall 412 defines at least one recess 414. The recess 414 includes two end portions 4141 (see FIG. 12). One end portion 4141 of the recess 414 is aligned with the surface of the casing 41 facing the base 49. The recess 414 does not pass through the side wall 412. That is, an inner portion of the side wall 412 forms a side of the recess 414, which is connected between the two end portions 4141 of the recess 414 (see FIG. 12). The edge of the side wall 412 away from the top surface 411 further defines a notch 415. In one embodiment, the casing 41 is rectangular, the number of side walls 412 is four. Each recess 414 is defined at the boundary of each of the side walls 412. The number of notches 415 is greater than four. At least two of the notches 415 are positioned at the edges of each side wall 412. Adhesive can be injected into the voice coil motor 40 through the notches 415. In other embodiments, the casing 41 may have a cylindrical side wall 412.

The base 49 includes a base portion 491 and at least one projection 492. In one embodiment, the number of projections 492 is four. The base portion 491 is in contact with the edges of the side wall 412 facing away from the top surface 411. The projection 492 protrudes from the base portion 391 along an extending direction of the side wall 412, and is received in the recess 414. The height of the projection 42 is less than the depth of the recess 414 (that is, a thickness of the casing 41).

Figure 12:
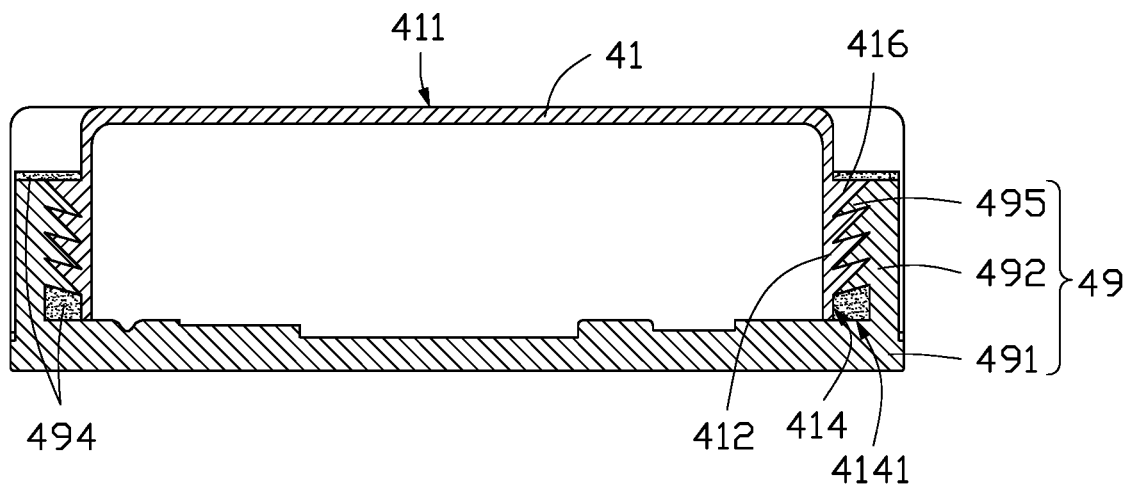
FIG. 12 is a cross-sectional view along line XII-XII of FIG. 11.

Referring to FIG. 12, the base 49 further includes a number of first sawteeth 495 extending to the casing 41. The casing 41 further includes a number of second sawteeth 416 facing the first sawteeth 495. In one embodiment, the second sawteeth 416 are disposed at an end of the recess 414 away from the base portion 491. The first sawteeth 495 are engaged with the second sawteeth 416. An adhesive layer 494 can be injected into the recess 414 for bonding the casing 41 and the base 49 together.

Figure 13:
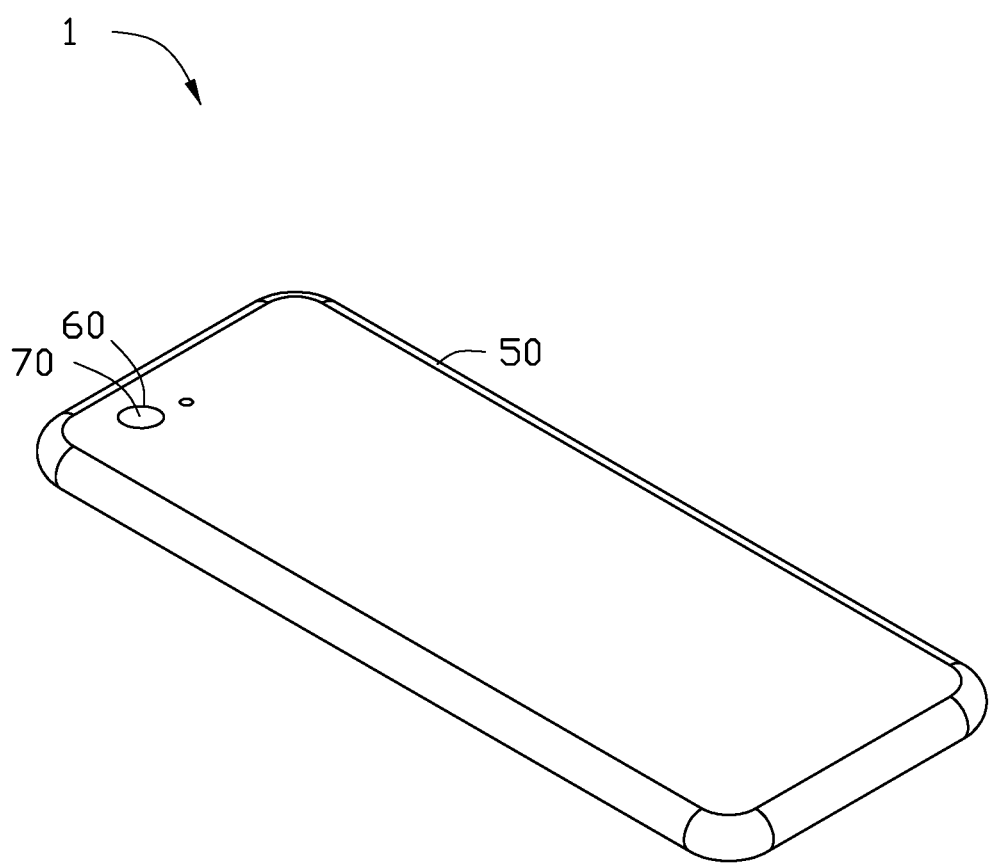
FIG. 13 is a schematic diagram of an electronic device including the voice coil motor.

Referring to FIG. 13, the electronic device 1 includes a main body 50 and a camera module 60 disposed in the main body 50. The camera module 60 further includes a voice coil motor 70. The voice coil motor 70 can be any of the voice coil motors described in the first to fourth embodiments. Referring to FIG. 13, the electronic device 1 is shown as a mobile phone. In other embodiments, the electronic device 1 can be a personal computer, a smart home appliance, or the like.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A voice coil motor comprising:
a casing, wherein the casing comprises a top surface and at least one side wall extending from an edge of the top surface; and
a base, wherein the base comprises a base portion and at least one projection, the base portion is connected to the side wall, at least one of the side wall defines at least one recess, each of the projection protrudes from the base portion along an extending direction of the side wall, the projection is received in the recess;
wherein each recess comprises two end portions, one of the two end portions is aligned with a surface of the casing facing the base, a first buckle is disposed on a side of the projection and extends to the casing, the casing further comprises a second buckle extending to the projection, the first buckle is engaged with the second buckle, the first buckle and the second buckle are spaced from the base, an adherence layer is adhered to a side of the first buckle adjacent to the base, the casing, and the base.

2. The voice coil motor of claim 1, wherein the base further comprises a plurality of first sawteeth extending to the casing, the casing further comprises a number of second sawteeth facing the first sawteeth, the first sawteeth are engaged with the second sawteeth, the first sawteeth are the first buckle, the second sawteeth are the second buckle.

3. The voice coil motor of claim 1, wherein an edge of the side wall away from the top surface defines a plurality of notches configured for adhesive to be injected into the voice coil motor.

4. A camera module comprising:
a voice coil motor comprising:
a casing, wherein the casing comprises a top surface and at least one side wall extending from an edge of the top surface; and
a base, wherein the base comprises a base portion and at least one projection, the base portion is connected to a side wall, the side wall defines at least one recess, each projection protrudes from the base portion along an extending direction of the side wall, the projection is received in the recess;
wherein each recess comprises two end portions, one of the two end portions is aligned with a surface of the casing facing the base, a first buckle is disposed on a side of the projection and extends to the casing, the casing further comprises a second buckle extending to the projection, the first buckle is engaged with the second buckle, the first buckle and the second buckle are spaced from the base, an adherence layer is adhered to a side of the first buckle adjacent to the base, the casing, and the base.

5. The camera module of claim 4, wherein an edge of the side wall away from the top surface defines a plurality of notches configured for adhesive to be injected into the voice coil motor.

6. The camera module of claim 4, wherein the base further comprises a plurality of first sawteeth extending to the casing, the casing further comprises a number of sawteeth facing the first sawtooth, the first sawteeth are engaged with the second sawteeth, the first sawteeth are the first buckle, the second sawteeth are the second buckle.

7. An electronic device comprising:
a main body, and
a voice coil motor disposed in the main body, the voice coil motor comprising:
  a casing, wherein the casing comprises a top surface and at least one side wall extending from an edge of the top surface; and
  a base, wherein the base comprises a base portion and at least one projection, the base portion is connected to the side wall, at least one side wall defines at least one recess, each projection protrudes from the base portion along an extending direction of the side wall, each projection is received in the recess;
wherein each recess comprises two end portions, one of the two end portions is aligned with a surface of the casing facing the base, a first buckle is disposed on a side of the projection and extends to the casing, the casing further comprises a second buckle extending to the projection, the first buckle is engaged with the second buckle, the first buckle and the second buckle are spaced from the base, an adherence layer is adhered to a side of the first buckle adjacent to the base, the casing, and the base.

8. The electronic device of claim 7, wherein an edge of the side wall away from the top surface defines a plurality of notches configured for adhesive to be injected into the voice coil motor.

9. The electronic device of claim 7, wherein the base further comprises a plurality of first sawteeth extending to the casing, the casing further comprises a number of second sawteeth facing the first sawtooth, the first sawteeth are engaged with the second sawteeth, the first sawteeth are the first buckle, the second sawteeth are the second buckle.

* * * * *